Patented Nov. 20, 1951

2,575,754

UNITED STATES PATENT OFFICE 2,575,754

STABILIZED CALCIUM PHOSPHATE PHOSPHOR

Herman C. Froelich and Joseph M. Margolis, Cleveland Heights, Ohio, assignors to General Electric Company, a corporation of New York No Drawing. Application October 26, 1950, Serial No. 192,363

5 Claims. (Cl. 252—301.4)

Our invention relates to fluorescent compositions and to the manufacture thereof, and more particularly to the known compositions of calcium orthophosphate doubly activated with trivalent cerium and divalent manganese and referred to hereinafter as the parent phosphor.

The said parent phosphor, when excited by ultra-violet radiations of 2537 Å. wavelength emits a deep red light and has been employed in fluorescent lamps in admixture with other phosphors to produce a white light, particularly where color rendition is important. As thus employed, the phosphor mixture is applied as a powdered coating to the interior surface of a low pressure mercury vapor lamp operating with a mercury vapor pressure of the order of 1–20 microns. However, it has been found that the parent phosphor, as heretofore constituted and manufactured, was not always satisfactory from the standpoint of lumen maintenance (upkeep of brightness during life of the lamp). The result was a color shift during burning of the lamp due to the fact that the parent phosphor depreciated more rapidly than did the other phosphors in the coating.

It is therefore an object of our invention to so modify the composition and manufacture of the said parent phosphor as to improve and stabilize its maintenance, and even its efficiency.

We have also discovered that in some cases the phosphor, when modified in accordance with our invention, exhibits greatly increased temperature stability, the brightness at about 300° C. being approximately three-fold the brightness of unmodified phosphor at the same temperature. The phosphor thereby becomes useful in conjunction with high pressure mercury vapor lamps for color-correction purposes. To that end the phosphor is applied as a coating on the inner surface of a glass bulb enclosing a high pressure (about one atmosphere to many atmospheres of mercury pressure) mercury vapor tube where it is excited by the ultraviolet radiations emitted by the mercury vapor tube to emit red light which supplements the blue-green light of the mercury vapor tube.

Further objects and advantages of our invention will appear from the following description.

We have discovered that the above objectives can be obtained by incorporating in the parent phosphor a small amount of certain metals of the second group of the periodic table, namely, zinc, strontium, barium, and magnesium. These metals may be incorporated in the phosphor simply by adding a suitable salt thereof to the batch ingredients before firing to synthesize the composition. The nature of the compound used to introduce the additive into the phosphor composition is of little importance; it is the cation, but the anion part of the compound which produces the desired effects, and it may be introduced as, for example, carbonate, chloride, phosphate, hydroxide, etc.

The useful ranges for the additive metals, in moles per mole CaO of the calcium-cerium-manganese orthophosphate phosphor are about .01 to .03 ZnO, .10 to .22 SrO, .01 to .10 BaO, and .01 to .02 MgO. A suitable firing temperature is in the range of about 1100–1250° C.

By way of example, a modified parent phosphor containing about .019 mole of ZnO per mole CaO as an additive may be prepared by using a batch consisting of

| | G. |
|---|---|
| $CaHPO_4$ | 204 |
| $CaCO_3$ | 33.3 |
| Ce Oxalate | 53 |
| $MnCO_3$ | 9.5 |
| $ZnNH_4PO_4$ | 6.3 | and mixing the ingredients well by tumbling, and then firing in air on quartz trays at 1240° C. for one hour. After cooling, the powder is ball-milled and then refired in air for one-half hour. From the furnace it is quickly transferred into a cooling chamber in which an atmosphere of 5% forming gas (5% hydrogen and 95% nitrogen) is maintained. When cooled down to room temperature the powder is sieved and then used for lamp making.

A series of phosphors with varying amounts of zinc additive gave the following results:

| Moles ZnO per Mole CaO | Per Cent Loss of Lumens, 0–100 Hours |
|---|---|
| 0 | 19.5 |
| .0048 | 18 |
| .0082 | 15.5 |
| .013 | 12 |
| .019 | 9.5 |
| .029 | 9 |

In the tests the initial efficiency of the phosphor was unaffected by the additions of zinc but the 100 hour reading, and thus the maintenance, was improved appreciably with increasing amounts of ZnO, which was introduced as zinc phosphate. No reduction of firing temperature with increasing ZnO content was necessary as sintering was not appreciable at 1240° C. even with the higher amounts of ZnO.

Another series of tests employing increasing amounts of strontium as the additive gave the following results:

| Moles SrO per Mole CaO | Per Cent Loss of Lumens, 0-100 Hours |
|---|---|
| 0 | 25 |
| .028 | 23 |
| .047 | 21 |
| .073 | 23 |
| .10 | 14 |
| .156 | 5.5 |
| .22 | 9 |

Tests with varying amounts of barium and magnesium also showed improved results. For instance, additions of .028 and .084 mole of BaO per mole CaO reduced the 100 hour loss of lumens to about 10.5 and 14.5 per cent respectively. Likewise, additions of about .01 and .02 mole of MgO per mole CaO reduced the 100 hour loss to about 15 and 9 per cent respectively. On the other hand, additions of cadmium and aluminum gave poorer results than were obtained with no additive.

Of the several additives disclosed herein, strontium is the only element which can be introduced in amounts as high as .22 mole per mole CaO. The other substituents cause either strong sintering or a strong reduction in fluorescent brightness, or both, when introduced in amounts much larger than those mentioned hereinbefore.

Some of the modified phosphors were also found to possess increased temperature stability. The parent phosphor with no additive had a brightness of only 18 per cent when heated in air to about 300° C. relative to its brightness at room temperature. On the other hand, additions of ZnO and BaO increased the relative brightness to 30 and 54 per cent respectively.

It will be understood, as heretofore known, that as to the parent phosphor itself (calcium phosphate activated with cerium and manganese) it is important for good results that the matrix be orthophosphate and that it be activated with trivalent (cerous) cerium. It is therefore necessary that the phosphor be processed in a reducing atmosphere, either by firing (and cooling) in a reducing atmosphere or (as in the examples given herein) firing in air and cooling in a reducing atmosphere. The proportions of activating manganese and cerium are not very critical, though best results are obtained with some 1 to 5 per cent of manganese and some 6 to 16 per cent of cerium, by weight of the fired phosphor.

What we claim as new and desire to secure by Letters Patent of the United States is:

1. A fluorescent composition consisting essentially of calcium orthophosphate and manganese and trivalent cerium in activator proportions and additive metal in the indicated amount relative to the CaO in the phosphor and selected from the group consisting of about .01 to .03 mole ZnO, .10 to .22 mole SrO, .01 to .10 mole BaO and .01 to .02 mole MgO.

2. A fluorescent composition consisting essentially of calcium orthophosphate and manganese and trivalent cerium in activator proportions and about .01 to .03 mole of ZnO per mole CaO in the phosphor.

3. A fluorescent composition consisting essentially of calcium orthophosphate and manganese and trivalent cerium in activator proportions and about .10 to .22 mole SrO per mole CaO in the phosphor.

4. A fluorescent composition consisting essentially of calcium orthophosphate and manganese and trivalent cerium in activator proportions and about .01 to .10 mole BaO per mole CaO in the phosphor.

5. The method of improving the stability of phosphor of calcium orthophosphate activated with manganese and trivalent cerium which comprises preparing a mixture of ingredients which when fired will yield the said phosphor, adding to the said mixture, before firing, a small amount of a salt of an additive metal in the indicated amount relative to the amount of CaO in the ingredients and selected from the group consisting of .01 to .03 mole ZnO, .10 to .22 mole SrO, .01 to .10 mole BaO and .01 to .02 mole MgO, and synthesizing the mixture at an elevated temperature of the order of 1100–1250° C. under reducing conditions.

HERMAN C. FROELICH.
JOSEPH M. MARGOLIS.

REFERENCES CITED

The following references are of record in the file of this patent:

UNITED STATES PATENTS

| Number | Name | Date |
|---|---|---|
| 2,241,950 | Huniger | May 13, 1941 |